Dec. 23, 1947.  G. D. SWEIER, JR  2,433,248

BEVERAGE MIXER AND COOLER

Filed Nov. 26, 1946

INVENTOR.
GEORGE D. SWEIER, JR.
BY
ATTORNEY

Patented Dec. 23, 1947

2,433,248

UNITED STATES PATENT OFFICE 2,433,248

BEVERAGE MIXER AND COOLER

George D. Sweier, Jr., Detroit, Mich.

Application November 26, 1946, Serial No. 712,377

1 Claim. (Cl. 259—72)

The present invention relates to a beverage mixer and cooler of the type shown in United States Letters Patent No. 2,021,495, dated November 19, 1935, and has for its main object and feature the provision of means whereby an interior ice shell or cage can be rotated within a container without danger of spilling the contents thereof.

In the accompanying drawings, the invention is shown in a concrete and preferred form in which.

Figure 1:
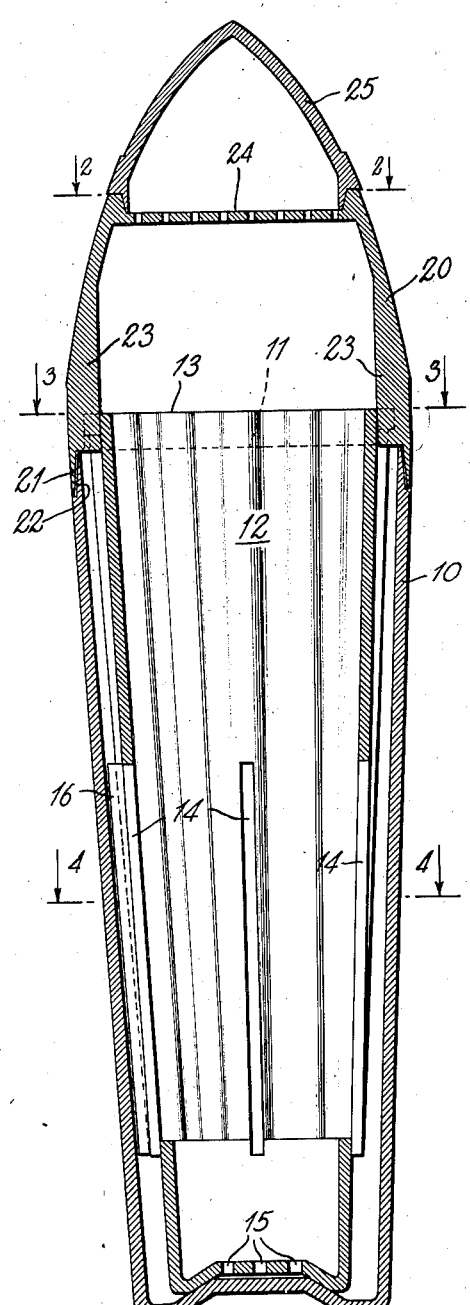
Figure 1 is a vertical sectional view through the mixer and cooler.
Figure 2:
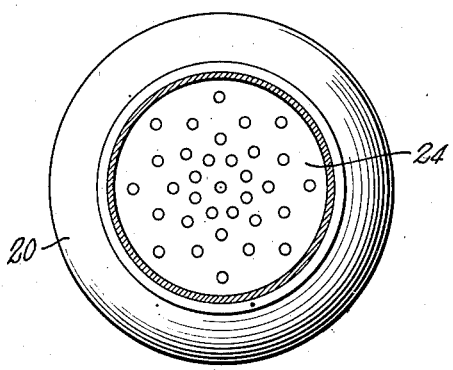
Figure 2 is a transverse sectional view substantially on the plane of line 2—2 of Figure 1.
Figure 3:
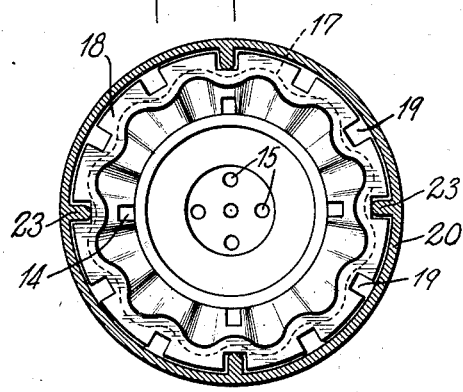
Figure 3 is a transverse sectional view substantially on the plane of line 3—3 of Figure 1.
Figure 4:
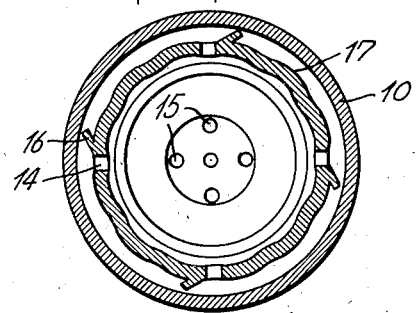
Figure 4 is a transverse sectional view substantially on the plane of line 4—4 of Figure 1.

10 indicates an outer liquid container having an open-top 11, and 12 is an inner ice-holding shell or cage having an open-top 13. Said shell 12 is in open communication with the container as by means of vertical openings 14 and is self-draining by reason of perforations 15 at the bottom of said shell. Adjacent openings 14 are outwardly extending blades 16 which assist in agitating the contents of the container when shell 12 is rotated within said container. Shell 12 may have lengthwise flutings 17 which also assist in agitating the liquid. Upper end 13 of shell 12 extends slightly above upper end 11 of container 10 and is provided with an outwardly extending circumferential lip 18 that is provided with a series of vertical slots 19. 20 indicates a cover member, the lower end of which has a smooth inner surface 21 that extends over and is rotatable with respect to outer smooth-face periphery 22 of the container. 23 indicate fins on the interior of the cover member located above the lower end thereof to engage slots 19 of shell 12. Thus cover member 20 is common to both container 10 and shell 12, is rotatable upon the container, and is rotatable with the shell, said slots 19 and fins 23 constituting complementary disengageable connecting means between the interior of the cover member and the exterior of the top of the shell.

24 indicates a strainer that bridges the upper end of cover member 20, and 25 and is a removable but tight-fitting top member situated on the upper end of the cover member and rotatable therewith.

One mode of operation is as follows: the beverage is placed within the open container, after which shell 12 containing the ice is lowered into the open container. Cover member 20, carrying top member 25, is then placed over the top of the container with fins 23 engaging in slots 19 of the shell. It will now be seen that, by turning the cover member, shell 12 will be rotated within the container, and it will be understood that the motion imparted may be either an oscillating motion or a turning movement in a single direction. As a matter of fact, by preference, the fit between the smooth inner surface indicated at 21 of the cover member and outer periphery 22 of the top of the container may be such that a spinning motion can be imparted to the cover member and shell. When the beverage has been sufficiently mixed and cooled, top member 25 is removed and the contents of the device poured out through strainer 24, or, if desired, the cover member and the shell may be removed, after which the contents of the container can be poured out.

I claim:

In a beverage mixer and cooler having an outer open-top liquid container and an inner open-top ice-holding shell that is in open communication with said container, the combination with the container and shell, of means to rotate said shell within said container comprising: an outwardly extending circumferential lip at the upper end of the shell having vertical slots, a cover member, common to both the container and shell, the lower end of which has a smooth inner surface that extends over and is rotatable with respect to the outer periphery of the top of the container, and fins on the interior of the cover member located above the lower end thereof to engage the slots of the shell.

GEORGE D. SWEIER, JR.

REFERENCES CITED

The following references are of record in the file of this patent:

UNITED STATES PATENTS

| Number | Name | Date |
|---|---|---|
| 58,165 | Dreunan | Sept. 16, 1866 |
| 1,042,751 | Barker | Oct. 29, 1912 |
| 1,975,462 | Jennings | Oct. 2, 1934 |
| 2,178,500 | Singer | Oct. 31, 1939 |